March 12, 1940.                    E. S. MARIS                    2,193,107
                              MULTISCALE INDICATOR
                              Filed Nov. 30, 1936                 2 Sheets-Sheet 1
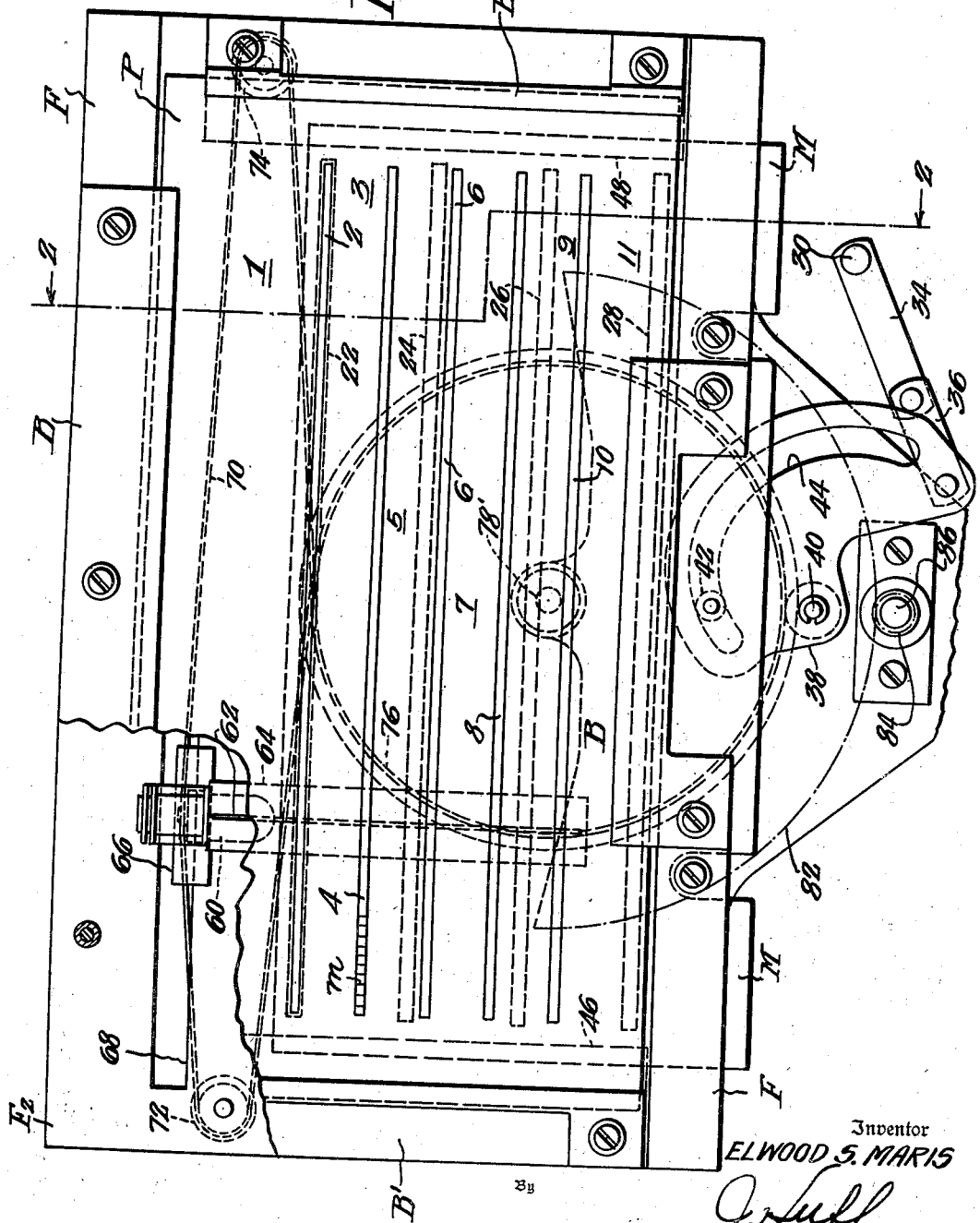
Inventor
ELWOOD S. MARIS
Attorney March 12, 1940.  E. S. MARIS  2,193,107
MULTISCALE INDICATOR
Filed Nov. 30, 1936  2 Sheets-Sheet 2
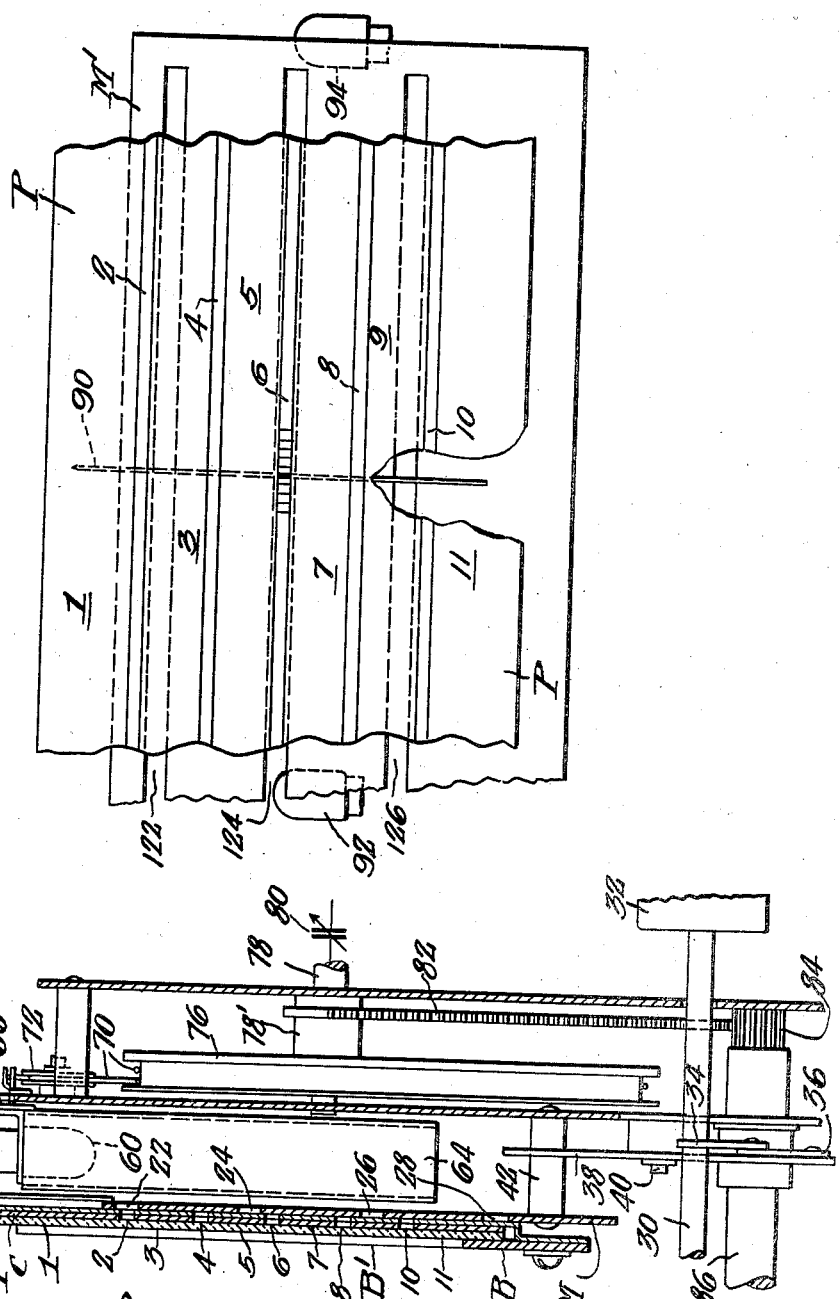
Inventor
ELWOOD S. MARIS
By
Attorney Patented Mar. 12, 1940

2,193,107

UNITED STATES PATENT OFFICE 2,193,107

MULTISCALE INDICATOR

Elwood S. Maris, Upper Darby, Pa., assignor to Radio Corporation of America, a corporation of Delaware Application November 30, 1936, Serial No. 113,461

2 Claims. (Cl. 116—124.1)

This invention relates to multiscale indicators, particularly to tuning indicators for radio apparatus and has special reference to the provision of a translucent multiscale indicator and to means for selectively illuminating the scales.

Modern radio receiving sets are usually capable of translating not only frequencies within the standard broadcast range but also frequencies within the intermediate, high and low frequency ranges. It is desirable, in order to avoid confusion, that some positive indication be given of the particular wave band in use. To this end, it has previously been proposed to selectively frame the several scales as the wave bands are changed in discrete steps by means of a multiposition switch. Thus, one known type of tuning indicator employs a glass plate upon which the scales are marked in spaced parallel array. The scale bearing surface is illuminated from the rear and means are provided for lifting the plate to bring the scales selectively into register with an aperture in the front panel of the set. Another known device employs a similar, but rigid, scale-bearing glass plate with a movable mask disposed between the source of illumination and the plate. The mask is provided with a slit of a contour similar to that of the scales so that when the slit is in register with a given scale, that scale, only, is illuminated.

One very real objection to indicators of the type described is that they occupy too much space. That this is so will be apparent when it is appreciated that the space required to permit of movement of the scale or mask through its entire range of movement is substantially twice that of the actual dimension (in the direction of movement) of the plate upon which the scales are marked.

Accordingly, an object of the present invention is to provide a multiscale indicator wherein the cabinet space required to accommodate the device is of a substantially constant and minimum area irrespective of any necessary relative movement between the scale and the scale-framing or scale-masking device.

Another object of the invention is to provide a multiscale indicator wherein a desired indication may be achieved by the application of minimum torque, or other force, to the device.

Still another object of the invention is to provide a simple, compact, inexpensive and trouble-free multiscale indicator and one which lends itself readily to mass production methods.

The above and other objects are achieved, in accordance with the invention, by the provision of an opaque surface having a plurality of translucent scales preferably arranged in equally spaced parallel relation thereon, a source of illumination for the scales, which may take the form of an illuminated pointer, and a mask of special design mounted for movement intermediate said source and the scale bearing surface. The mask has a plurality of slots therein so spaced with respect to the translucent scales that upon alignment of a given slot with a selected scale the other of said slots will lie adjacent opaque portions of the scale bearing surface whereby but a single scale is illuminated at any given moment. A traveling pointer common to all of the scales is disposed behind the mask; it is preferably illuminated throughout its length but since at any given moment the mask conceals all but one of the scales the indication provided by the pointer is visible adjacent only that one of said scales.

Certain details of construction, together with other objects and advantages will be apparent and the invention itself will be best understood by reference to the following specification and to the accompanying drawings, wherein:

Fig. 1 is a front elevation of a five-band tuning scale and shutter or mask therefor, a portion of the frame supporting the scale-bearing surface being broken away to show a pointer and pointer moving mechanism, Fig. 2 is a sectional elevation taken on the line 2—2 of Fig. 1, and Fig. 3 is a fragmentary front elevation of an alternative form of shutter and pointer for a five-band scale of the type shown in Fig. 1.

In Figs. 1 and 2, F designates a front panel or frame which carries a plate P formed of glass or other translucent material; brackets B and B' fixed respectively to the horizontal and vertical edges of the frame serve to secure the plate P against movement. Plate P has a plurality of scale areas 2, 4, 6, 8 and 10, arranged thereon. These areas are translucent and the spaces 1, 3, 5, 7, 9, 11, between them have been rendered opaque as by a coating or film C (Fig. 2) of paint, dark paper or the like. The scale indicia may be of any suitable type; for instance, as indicated on scale 4, they may comprise semi-transparent markings $m$ spanning the transparent scale areas. Unless some agency intervenes, light from a source 60 (later described), impinging on the rear of plate P, will illuminate all of the scales 2, 4, 6, 8, and 10, simultaneously.

For the purpose of confining illumination to a selected single scale, the present invention contemplates the use of a mask M of special design, mounted for vertical movement intermediate the light source and the rear surface of the scale bearing plate P.

This mask M contains a plurality of slots therein, so spaced with respect to the translucent scale areas that upon alignment of a given slot with a selected scale, the other of the slots will lie adjacent opaque portions of the scale bearing surface P. This ensures that but a single scale will be illuminated at any given moment.

The mask M of Figs. 1 and 2 contains four apertures or slots 22, 24, 26, 28, whose dimensions are preferably slightly larger than the dimensions of the translucent scale areas on plate P. The slots are equally spaced one from another and the space between them is greater than the space between adjacent of the scales.

On a five-band indicator, successfully operated, the scale areas were each $\frac{1}{8}''$, and were spaced from each other $\frac{3}{16}''$, whereas the four slots in the mask were each $\frac{3}{16}''$ and were spaced $\frac{15}{16}''$ from each other. Thus, as shown in Fig. 1, when the top slot 22 is in register with the top scale 2, slot 24 is behind the opaque portion 5 between scales 4 and 6, slot 26 is behind the opaque portion 9 between scales 8 and 10, and slot 28 is behind the opaque portion 11 beneath the bottom scale 10.

The mask is adapted to be moved up and down in discrete steps by means of a knob (not shown) fixed on the terminal of a shaft 30 which is connected to a suitable wave-change mechanism 32 (Fig. 2). Lever arms 34 and 36 extend from this shaft 30 to a slotted cam 38 which is pivoted for rotation about an axis 40. A cam follower 42 fixed to the mask M rides in the slot 44 in cam 38 so that when the wave-change mechanism is moved in discrete steps, the follower 42 and hence the mask M is moved up or down, as the case may be, a similar number of steps. The mask M moves in brackets 46, 48 fixed to the back of frame F. As shown in Fig. 2, a central guide, in the form of a short rod 50 which travels in a guideway 52 may also be provided if desired.

The source of illumination, pointer, and pointer moving mechanism for use with the scale plate P and shutter M of Figs. 1 and 2, may be of any suitable or convenient type. In the embodiment referred to the only illumination appearing adjacent a selected scale is a line or pointer of light projected through a slot 62 in a housing or shield 64 which is mounted for movement behind the mask M. The interior of shield 64 may be painted white, or it may be polished, to project light provided by a lamp 60 upon the unmasked rear surface of a selected scale. Lamp 60 and its shield 64 are fixed to a bracket 66, and the bracket is slidably mounted upon an edge 68 of a rear mounting plate or frame F².

The pointer assembly is moved transversely of the scale bearing surface P, by means of a taut cord 70 which is secured to the slidable bracket 66 and looped around a pair of pulleys 72 and 74, supported for rotation on opposite sides of the rear mounting frame F². As more clearly shown in Fig. 2, this pointer driving cord 70 also extends around the periphery of a third pulley 76 which is fixed on an extension 78' of the shaft 78 carrying the main tuning element 80 of the set. Shaft 78 carries a gear 82 which meshes with a driving gear 84 fixed on tuning shaft 86 which extends through the front panel of the set.

A desired band having been selected by movement of the wave change shaft 30, and with the mask M moved into position to permit the illuminated pointer to be viewed adjacent the scale individual to the band selected, tuning is accomplished by rotating the tuning shaft 86. This drives the condenser shaft 78 through gears 82 and 84. Since the central pulley 76 about which cord 70 is wrapped, is fixed on shaft 78, it too will rotate, causing the pointer 64 and its bracket 66 to move transversely across the scale in the direction of movement of the tuning shaft 78.

In the embodiment of the invention shown in Fig. 3, a rod-like unilluminated pointer 90 is disposed between the scale bearing surface P and its mask, here designated M'. This pointer 90 travels in front of a general source of illumination, indicated by lamps 92 and 94, so that the pointer provides an opaque indication upon a single scale which is illuminated throughout its length. The scale bearing surface P, like that of Figs. 1 and 2, carries five frequency band scales. The mask M', however, contains but three slots 122, 124 and 126 therein. In an actual embodiment of the invention, where the individual scales were $\frac{1}{8}''$ and the opaque region between each adjacent pair of scales was $\frac{3}{16}''$, the apertures in the mask measured $\frac{3}{16}''$ and were spaced $\frac{15}{16}''$ from each other.

As shown in the drawings, the central slot 124 is in register with the middle scale area 6, while slots 122 and 126 lie adjacent opaque sections 3 and 9, respectively, so that only scale 6 receives light from lamps 92 and 94.

The mechanisms for moving the pointer and the mask will be understood to be similar to those shown in Figs. 1 and 2. If the mask M' is moved up one step, slot 122 will register with scale 2. If moved down one step, slot 126 will register with scale 10. In order to illuminate scale 8 the mask must be moved up two steps, in which case slot 126 will be in register with it. To provide illumination for scale 4 the mask is moved down two steps to bring slot 122 in register therewith.

From the foregoing it will be apparent that the cabinet space required to permit of maximum movement of the mask need be substantially no greater than that occupied by the scale bearing surface itself. This permits of the construction of more compact and economical receiver units. Further, the tuning operation is facilitated since the torque required to move the mask is substantially less than that required in apparatus employing scale selecting mechanisms of the prior art.

This invention is not intended to be restricted in scope to the specific embodiments shown, but contemplate such modifications as are within the spirit of the appended claims.

What is claimed is:

1. An indicator comprising an opaque surface having a plurality of translucent scales arranged thereon, a mask mounted for movement in a plane adjacent and parallel to the plane of said scale bearing surface, a source of light behind said mask, said mask having a plurality of slots therein so spaced with respect to said translucent scales that upon alignment of a given slot with a selected scale the other of said slots will lie adjacent opaque portions of said scale whereby but a single scale is illuminated at a given moment, a pointer mounted for movement behind said scale bearing surface on the side of said mask remote from said scale bearing surface, and means for moving said pointer across said scale bearing surface.

2. An indicator comprising an opaque surface having a plurality of translucent scales arranged thereon, a mask mounted for movement in a plane adjacent and parallel to the plane of said scale bearing surface, said mask having a plurality of slots therein so spaced with respect to said translucent scales that upon alignment of a given slot with a selected scale the other of said slots will lie adjacent opaque portions of said scale, a pointer mounted for movement behind said scale bearing surface and common to said scales, a source of light contained within said pointer, and means for moving said pointer across said scale bearing surface.

ELWOOD S. MARIS.